June 28, 1960 D. R. ROWLAND 2,942,902
JOINT CLOSURE
Filed Oct. 29, 1956
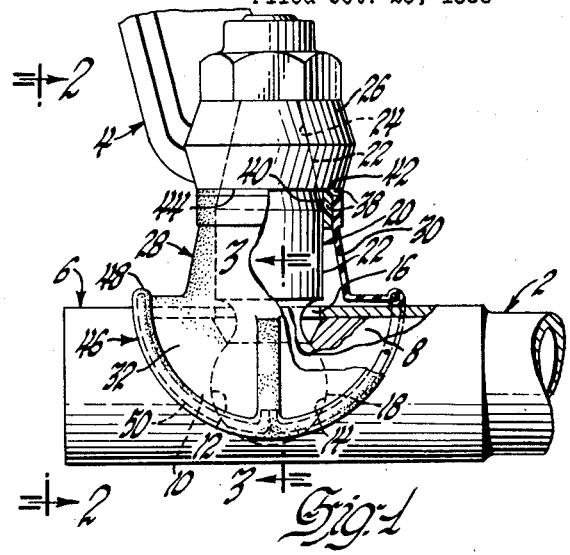
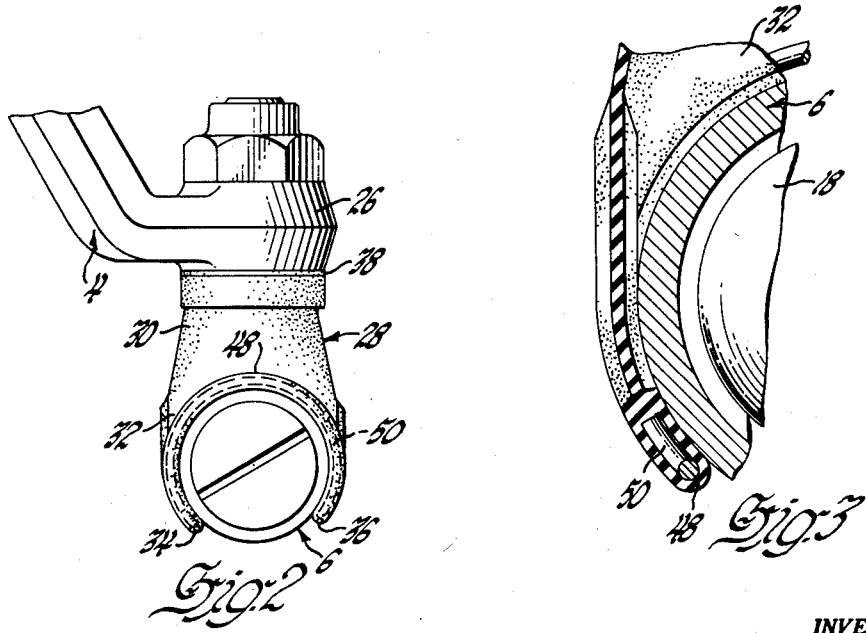
INVENTOR.
Don R. Rowland
BY
W. S. Pettigrew
ATTORNEY

United States Patent Office 2,942,902
Patented June 28, 1960

2,942,902
JOINT CLOSURE

Dan R. Rowland, Saginaw, Mich., assignor to General Motors Corporation, Detroit, Mich., a corporation of Delaware Filed Oct. 29, 1956, Ser. No. 618,941

6 Claims. (Cl. 287—90)

This invention relates to closures and more particularly to flexible closures for mechanical joints such as ball and socket joints in vehicle steering mechanisms.

An object of the present invention is to provide an improved closure for joint connections.

Another object is to provide an effective closure for joint connections which will not interfere with the normal operation thereof.

A further object is to provide a flexible closure for joint connections which is adapted for self-retaining engagement with the associated parts of the joint.

A further object is to provide a closure of the type described which is extremely easy to install and remove.

These and other objects, advantages and features of the invention will become more fully apparent as reference is had to the accompanying specification and drawings wherein:

Fig. 1 is a side elevational view, partly in section and with parts broken away, illustrating the improved closure.

Fig. 2 is an end elevation of the construction shown in Fig. 1; and

Fig. 3 is an enlarged fragmentary sectional view looking in the direction of arrows 3—3 of Fig. 1.

Referring now to the drawings and particularly Fig. 1, the invention is shown as applied to a universal joint connection in a steering mechanism such as between a relay rod 2 and a pitman arm 4 of a steering mechanism. It should be understood, however, that the invention is in no sense limited to the specific embodiment shown but is equally applicable in any other joint of similar character. In the illustrated embodiment, relay rod 2 is provided at its end with a tubular casing 6 in which are disposed a pair of bearing elements 8 and 10 having semi-spherical opposed end surfaces 12 and 14. An elongated aperture 16 is formed in the peripheral wall of casing 6 adjacent the space between elements 8 and 10. Aperture 16 is adapted to permit insertion of the ball end 18 of a ball stud member 20, into the space between the semi-spherical bearing surfaces 12 and 14 of bearing members 8 and 10. The shank 22 formed integrally on ball end 18 extends outwardly through aperture 16 and has a tapered end portion which is received in a cooperating tapered aperture 24 formed in the terminal end 26 of pitman arm 4.

According to the present invention, there is provided a flexible closure 28 for sealing the juncture between ball stud 18 and aperture 16. Flexible member 28 is preferably a one-piece molded elastomeric body having a relatively thin wall section. As seen best in Fig. 1, member 28 comprises a generally frusto-conical neck portion 30 and a connecting saddle-shaped clasping portion 32. Neck portion 30 surrounds the portion of shank 22 between pitman arm end 26 and casing 6, while saddle-shaped portion 32 resiliently grips the portion of the peripheral wall of casing 6 surrounding aperture 16. As seen best in Fig. 2, the lower side extremities 34 and 36 of saddle portion 32 extend somewhat beyond the diametral centerline of casing 6 in order to assure positive clasping engagement and assure a dust free seal therewith.

In accordance with one feature of the invention, the inner wall of the upper extremity of neck portion 30 has molded thereto an annular bearing member 38. Member 38 is generally L-shaped in cross section and is preferably formed of nylon or other suitable low friction material. As seen in Fig. 1, element 38 provides a radial bearing surface 40 and an axial bearing surface 42. Bearing surface 40 closely engages stud 20 which bearing surface 42 is resiliently urged into engagement with the bottom face 44 of end portion 26 by the slight axial deformation of neck portion 30, thus assuring an efficient seal while eliminating torsional stresses on neck portion 30 during rotary movement of the ball stud 20 relative to casing 6.

In accordance with another feature of the invention, the perimetral lip 46 of saddle portion 32 is formed with an enlarged continuous bead 48 of generally circular cross section, in which is molded a wire spring element 50. Spring 50 is preferably preformed to conform with the general contour defined by perimetral lip 46. In operation, the spring reinforces and improves the resilient clasping action of the lip against the peripheral wall of casing 6 and assures positive sealing engagement therewith regardless of angular deflection of ball stud 18.

From the foregoing it will be seen that an improved and substantially simplified joint seal has been provided. It is to be particularly noted that installation, removal and replacement of a seal constructed according to the present invention is extremely simple. In addition, because of the self-retaining action of the saddle portion, additional parts, heretofore required, are totally eliminated. Hence, the closure is not only more economical by virtue of fewer parts but also because of the reduced installation time resulting from reduction in parts.

While but one embodiment of the invention has been shown and described, it will be apparent that other changes and modifications may be made therein. It is therefore, to be understood that it is not intended to limit the invention to the embodiment shown, but only by the scope of the claims which follow.

I claim:

1. In association with a generally tubular member having a socket formed therein and a ball stud articulated in said socket, a one-piece flexible cover for sealing the juncture of said ball stud and said socket, said cover comprising a neck portion adapted to surround said stud and a saddle-like base portion adapted for snap-on engagement over the wall of said tubular portion surrounding said socket, said neck portion incorporating a collar of low friction bearing material around the inner wall of the mouth thereof, and a resilient reinforcing member in the perimetral lip of said base portion serving to increase the resilient clasping action of said lip with said tubular member.

2. In association with a generally tubular member having an aperture formed therein and a ball stud disposed in said tubular member and extending through said aperture, a one-piece flexible cover for sealing the juncture of said ball stud and said aperture, said cover comprising a generally cylindrical neck portion adapted to surround said stud and a saddle-like base portion adapted for snap-on engagement over the wall of said tubular portion surrounding said aperture, said neck portion having a nylon bearing member secured in the mouth of said neck portion and surrounding said stud, and a preformed resilient reinforcing member molded in the perimetral lip of said base portion to provide self-retaining clasping action of said lip with said tubular member.

3. As an article of manufacture, a relatively thin walled flexible body comprising an annular neck portion connected to a generally saddle-shaped portion, an annular collar of low friction material molded around the inner wall of the mouth of said neck portion, and a preformed wire spring molded in the peripheral lip of said saddle portion, said spring in relaxed position conforming with the contour of the perimetral lip of said saddle-shaped portion and extending continuously therearound.

4. As an article of manufacture, an elastomeric body comprising an annular neck portion merging into a generally saddle-shaped base portion, an annular bearing collar molded in the mouth of said neck portion, and a preformed wire spring molded in the permietral lip of said saddle portion.

5. The structure set forth in claim 4 wherein the portion of said perimetral lip surrounding said wire spring is formed with an enlarged bead.

6. The structure set forth in claim 3 wherein said annular collar is generally L-shaped in cross section to provide both a radial and axial bearing surface.

References Cited in the file of this patent
UNITED STATES PATENTS

| | | |
|---|---|---|
| 1,221,015 | Beck | Apr. 3, 1917 |
| 1,389,224 | Sheppy | Aug. 30, 1921 |
| 1,431,112 | Gunn | Oct. 3, 1922 |
| 1,598,155 | Salisbury | Aug. 31, 1926 |
| 1,777,129 | Robbins | Sept. 30, 1930 |
| 1,815,771 | Grant | July 21, 1931 |
| 2,206,471 | Taylor | July 2, 1940 |
| 2,271,293 | Flumerfelt | Jan. 27, 1942 |
| 2,755,116 | Alldredge | July 17, 1956 |
| 2,827,303 | Herbenar | Mar. 18, 1958 |